United States Patent
Berkowitz

(10) Patent No.: US 7,805,291 B1
(45) Date of Patent: Sep. 28, 2010

(54) METHOD OF IDENTIFYING TOPIC OF TEXT USING NOUNS

(75) Inventor: Sidney Berkowitz, Baltimore, MD (US)

(73) Assignee: The United States of America as represented by the Director National Security Agency, Washington, DC (US)

( * ) Notice: Subject to any disclaimer, the term of this patent is extended or adjusted under 35 U.S.C. 154(b) by 1272 days.

(21) Appl. No.: 11/137,594

(22) Filed: May 25, 2005

(51) Int. Cl.
G06F 17/27 (2006.01)
(52) U.S. Cl. .......................................... 704/9
(58) Field of Classification Search .............. 704/4, 704/7, 10
See application file for complete search history.

(56) References Cited

U.S. PATENT DOCUMENTS

| | | | |
|---|---|---|---|
| 5,418,951 | A | 5/1995 | Damashek |
| 5,937,422 | A | 8/1999 | Nelson et al. |
| 6,122,647 | A * | 9/2000 | Horowitz et al. ............ 715/205 |
| 6,199,034 | B1 * | 3/2001 | Wical ............................ 704/9 |
| 6,638,317 | B2 | 10/2003 | Nakao |
| 2003/0167252 | A1 | 9/2003 | Odom et al. |
| 2003/0182631 | A1 | 9/2003 | Tsochantaridis et al. |
| 2004/0029085 | A1 * | 2/2004 | Hu et al. ..................... 434/178 |
| 2004/0122657 | A1 | 6/2004 | Brants et al. |
| 2004/0205457 | A1 | 10/2004 | Bent et al. |

OTHER PUBLICATIONS

Lin et al, "Identifying Topics by Position", 1997, In Proc. of the Applied Natural Language Processing Conf., pp. 283-290.*
Lin et al , "Knowledge Based Automatic Topic Identification", 1995, In Proc. of the 33rd Annual Meeting of the ACL, pp. 308-310.*
Clifton et al, "TopCat: Data Mining for Topic Identification in a Text Corpus", 1999, In Proc. of the 3rd European Conf. of Principles and Practice of knowledge Discovery in Databases, pp. 1-33.*

* cited by examiner

*Primary Examiner*—James S Wozniak
*Assistant Examiner*—Olujimi A Adesanya
(74) *Attorney, Agent, or Firm*—Robert D. Morelli

(57) ABSTRACT

A method of identifying a topic of a text. Text is received. Then, the nouns in the text are identified. The singular form of each identified noun is determined. Combinations are created of the singular form of the identified nouns, where the number of singular forms of the nouns in the combinations is user-definable. The frequency of occurrence in the text of each noun that corresponds to its singular form is determined. Each frequency of occurrence is assigned as a score to its corresponding singular form noun. Each combination of singular form nouns is assigned a score that is equal to the sum of the scores of its constituent singular form nouns. The user-definable number of top scoring singular form nouns and combinations of singular form nouns are selected as the topic of the text.

2 Claims, 1 Drawing Sheet

METHOD OF IDENTIFYING TOPIC OF TEXT USING NOUNS

FIELD OF INVENTION

The present invention relates, in general, to data processing of a document and, in particular, to topic identification.

BACKGROUND OF THE INVENTION

There is continuing research in the area of topic identification. Previous methods in this area are based on the use of keywords. A disadvantage of such a method is that any variation in the spelling of a keyword without any significant change in meaning might cause the performance of the method to degrade. One proposed solution to this problem is to use a dictionary, thesaurus, or semantic index to generate variations of the keyword. This suggestion improves performance when there is a spelling variation without a change in meaning, but causes further performance degradation when there is a change in meaning in the presence of similar spelling.

U.S. Pat. No. 5,418,951, entitled "METHOD OF RETRIEVING DOCUMENTS THAT CONCERN THE SAME TOPIC," discloses a method of identifying the topic of a document using segments of text called n-grams, where ~1 indicates the number of characters in the textual segment. The present invention does not use n-grams to identify the topic of text as does U.S. Pat. No. 5,418,951. U.S. Pat. No. 5,418,951 is hereby incorporated by reference into the specification of the present invention.

U.S. Pat. No. 5,937,422, entitled "AUTOMATICALLY GENERATING A TOPIC DESCRIPTION FOR TEXT AND SEARCHING AND SORTING TEXT BY TOPIC USING THE SAME," discloses a method of identifying a topic of text by using the definition of each word in the text. The present invention does not require the use of the definition of each word in a text as does U.S. Pat. No. 5,937,422. U.S. Pat. No. 5,937,422 is hereby incorporated by reference into the specification of the present invention.

U.S. Pat. No. 6,638,317, entitled "APPARATUS AND METHOD FOR GENERATING DIGEST ACCORDING TO HIERARCHICAL STRUCTURE OF TOPIC," discloses a method of calculating a lexical cohesion degree at each position in a document and extracting key sentences and generates a digest based on the relationship between a target passage and a passage containing the target passage. The present invention neither extracts sentences nor compares a target passage to another passage containing the target passage as does U.S. Pat. No. 6,638,317. U.S. Pat. No. 6,638,317 is hereby incorporated by reference into the specification of the present invention.

U.S. Pat. Appl. No. 20030167252, entitled "TOPIC IDENTIFICATION AND USE THEREOF IN INFORMATION RETRIEVAL SYSTEMS," discloses a method of identifying a topic of text by identifying the most frequently occurring combinations of words in the text. The present invention does not identify the topic of text by identifying the most frequently occurring combination of words in a text as does U.S. Pat. Appl. No. 20030167252. U.S. Pat. Appl. No. 20030167252 is hereby incorporated by reference into the specification of the present invention.

U.S. Pat. Appl. No. 20030182631, entitled "SYSTEMS AND METHODS FOR DETERMINING THE TOPIC STRUCTURE OF A PORTION OF TEXT," discloses a method of identifying a topic of text using a Probabilistic Latent Semantic Analysis. The present invention does not identify the topic of text by using a Probabilistic Latent Semantic Analysis as does U.S. Pat. Appl. No. 20030182631. U.S. Pat. Appl. No. 20030182631 is hereby incorporated by reference into the specification of the present invention.

U.S. Pat. Appl. No. 20040122657, entitled "SYSTEMS AND METHODS FOR INTERACTIVE TOPIC-BASED TEXT SUMMARIZATION," discloses a method of identifying a topic of text using key phrases, n-grams, and sentences. The present invention does not identify the topic of text by using key phrases, n-grams, and sentences as does U.S. Pat. Appl. No. 20040122657. U.S. Pat. Appl. No. 20040122657 is hereby incorporated by reference into the specification of the present invention.

U.S. Pat. Appl. No. 20040205457, entitled "AUTOMATIC SUMMARISING TOPICS IN A COLLECTION OF ELECTRONIC DOCUMENTS," discloses a method of identifying a topic of text using vectors of terms and sentences to create a correlation matrix. The present invention does not identify the topic of text by using vectors of terms and sentences to create a correlation matrix as does U.S. Pat. Appl. No. 20040205457. U.S. Pat. Appl. No. 20040205457 is hereby incorporated by reference into the specification of the present invention.

SUMMARY OF THE INVENTION

It is an object of the present invention to identify the topic of text.

It is another object of the present invention to identify the topic of text using nouns that occur in the text.

The present invention is a method of identify the topic of text using nouns that occur in the text.

The first step of the method is receiving the text.

The second step of the method is identifying each unique word in the text that is a noun.

The third step of the method is determining a singular form of each identified noun.

The fourth step of the method is creating combinations of the singular forms of the identified nouns, where the number of singular forms of the nouns in each combination is user-definable.

The fifth step of the method is determining a frequency of occurrence in the text of each identified noun.

The sixth step of the method is assigning a score to each singular form noun, where the score of each singular form noun is the frequency of occurrence of the corresponding noun determined in the fifth step.

The seventh step of the method is assigning a score to each combination of singular form nouns, where the score of each combination is a sum of the scores of the singular form nouns in the combination.

The eighth step of the method is selecting a user-definable number of scores of singular form nouns that are greatest in value.

The ninth step of the method is selecting a user-definable number of scores of combinations of singular form nouns that are greatest in value.

The tenth, and last, step of the method is returning the singular forms of nouns and the combinations of singular form nouns that correspond to the scores selected in the eighth and ninth steps as the topic of the text.

DETAILED DESCRIPTION

Figure 1:
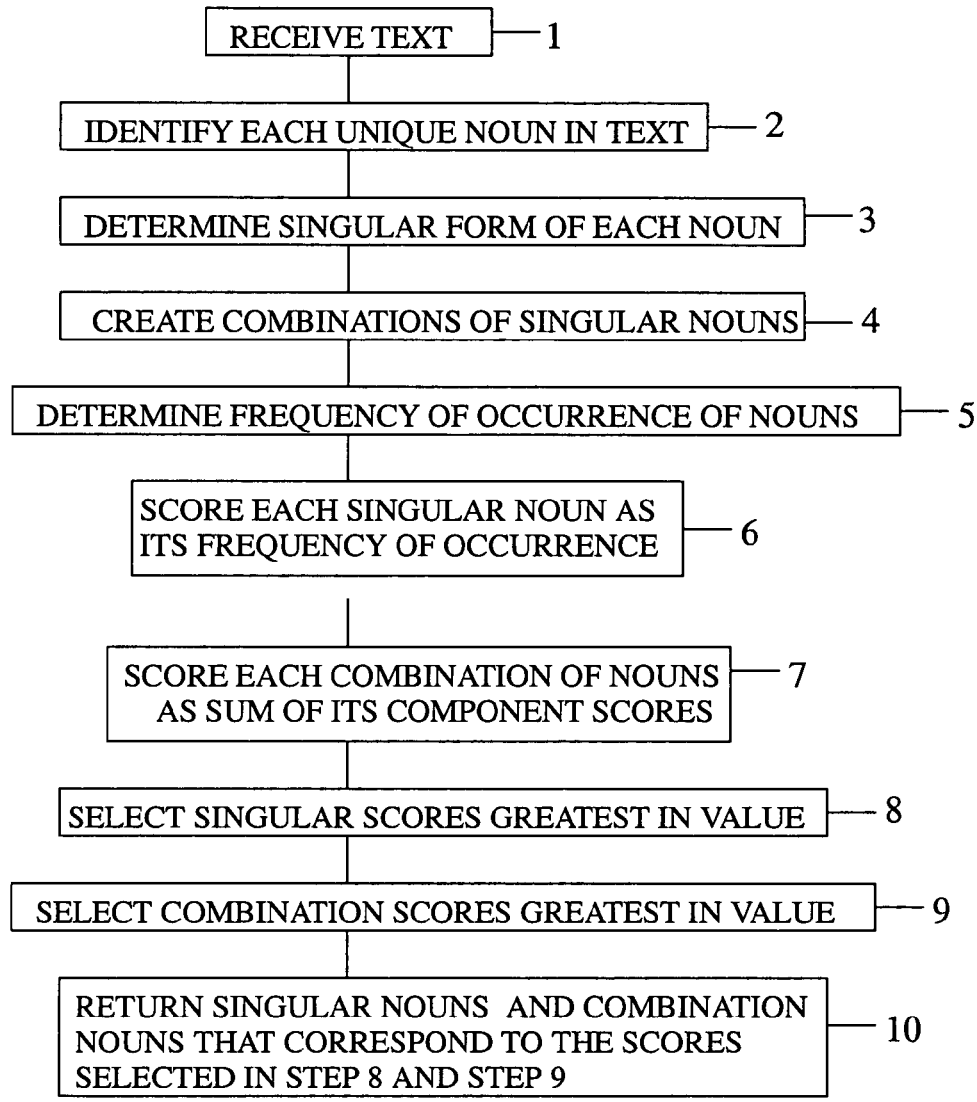
FIG. 1 is a flowchart of the steps of the present invention.

The present invention is a method of identify the topic of text using nouns that occur in the text.

FIG. 1 is a flowchart of the method of the present invention.

The first step 1 of the method is receiving the text. The text includes words. The text may be speech-based text, optical-character-read text, and any other suitable and equivalent text.

The second step 2 of the method is identifying each unique word in the text that is a noun. For example, the text includes three unique words, desks, chairs, and lamps.

The third step 3 of the method is determining a singular form of each identified noun. In the present example, the singular forms of desks, chairs, and lamps are desk, chair, and lamp.

The fourth step 4 of the method is creating combinations of the singular forms of the identified nouns, where the number of singular forms of the nouns in each combination is user-definable. In the present example, the following combinations are created if the user selects the number 2 as the user-definable number of singular form nouns to be included in the combinations: (desk chair), (desk lamp), and (chair, lamp).

The fifth step 5 of the method is determining a frequency of occurrence in the text of each identified noun. In the present example, desks may have occurred 3 times in the text, chairs twice, and lamp once.

The sixth step 6 of the method is assigning a score to each singular form noun, where the score of each singular form noun is the frequency of occurrence of the corresponding noun determined in the fifth step. In the present example, desk is assigned the score 3, chair the score 2, and lamp the score 1.

The seventh step 7 of the method is assigning a score to each combination of singular form nouns, where the score of each combination is a sum of the scores of the singular form nouns in the combination. In the present example, (desk chair) is assigned the score 3+2=5, (desk lamp) the score 3+1=4, and (chair lamp) the score 2+1=3.

The eighth step 8 of the method is selecting a user-definable number of scores of singular form nouns that are greatest in value. In the present example, the following singular form nouns are selected if the user selects the number 2 as the user-definable number:

desk; and
chair.

The ninth step 9 of the method is selecting a user-definable number of scores of combinations of singular form nouns that are greatest in value. In the present example, the following combinations of singular form nouns are selected if the user selects the number 2 as the user-definable number:

desk chair; and
desk lamp.

The tenth, and last, step 10 of the method is returning the singular forms of nouns and the combinations of singular form nouns that correspond to the scores selected in the eighth step 8 and the ninth step 9 as the topic of the text. In the present example, the topic is returned as follows:

desk;
chair;
desk chair; and
desk lamp.

What is claimed is:

1. A method of identifying a topic of a text, comprising the steps of
   a) receiving the text, where the text includes words;
   b) identifying in a hardware device each unique word in the text that is a noun;
   c) determining in the hardware device a singular form of each noun identified in step (b);
   d) creating in the hardware device combinations of the singular forms of the nouns determined in step (c), where the number of singular forms of the nouns in each combination is a user-definable;
   e) determining in the hardware device a frequency of occurrence in the text of each noun identified in step (b);
   f) assigning in the hardware device a score to each singular form noun, where the score of each singular form noun is the frequency of occurrence of the corresponding noun determined in step (e);
   g) assigning in the hardware device a score to each combination of singular form nouns, where the score of each combination of singular form nouns is a sum of the scores of the singular form nouns in the combination;
   h) selecting in the hardware device a user-definable number of scores of singular form nouns that are greatest in value;
   i) selecting in the hardware device a user-definable number of scores of combinations of singular form nouns that are greatest in value; and
   j) returning from the hardware device the singular forms of nouns and the combinations of singular forms nouns that correspond to the scores selected in step (h) and step (i) as the topic of the text.

2. The method of claim 1, wherein said step of receiving the text is comprised of the step of receiving the text, where the text is selected from the group of text consisting of speech-based text, optical-character-read text, and any other suitable and equivalent text.

* * * * *